G. L. NOBLE.
OLEO STOCK CLARIFIER, SEEDER, AND BREAKER.
APPLICATION FILED NOV. 15, 1916.
1,240,869.
Patented Sept. 25, 1917.
2 SHEETS—SHEET 1.
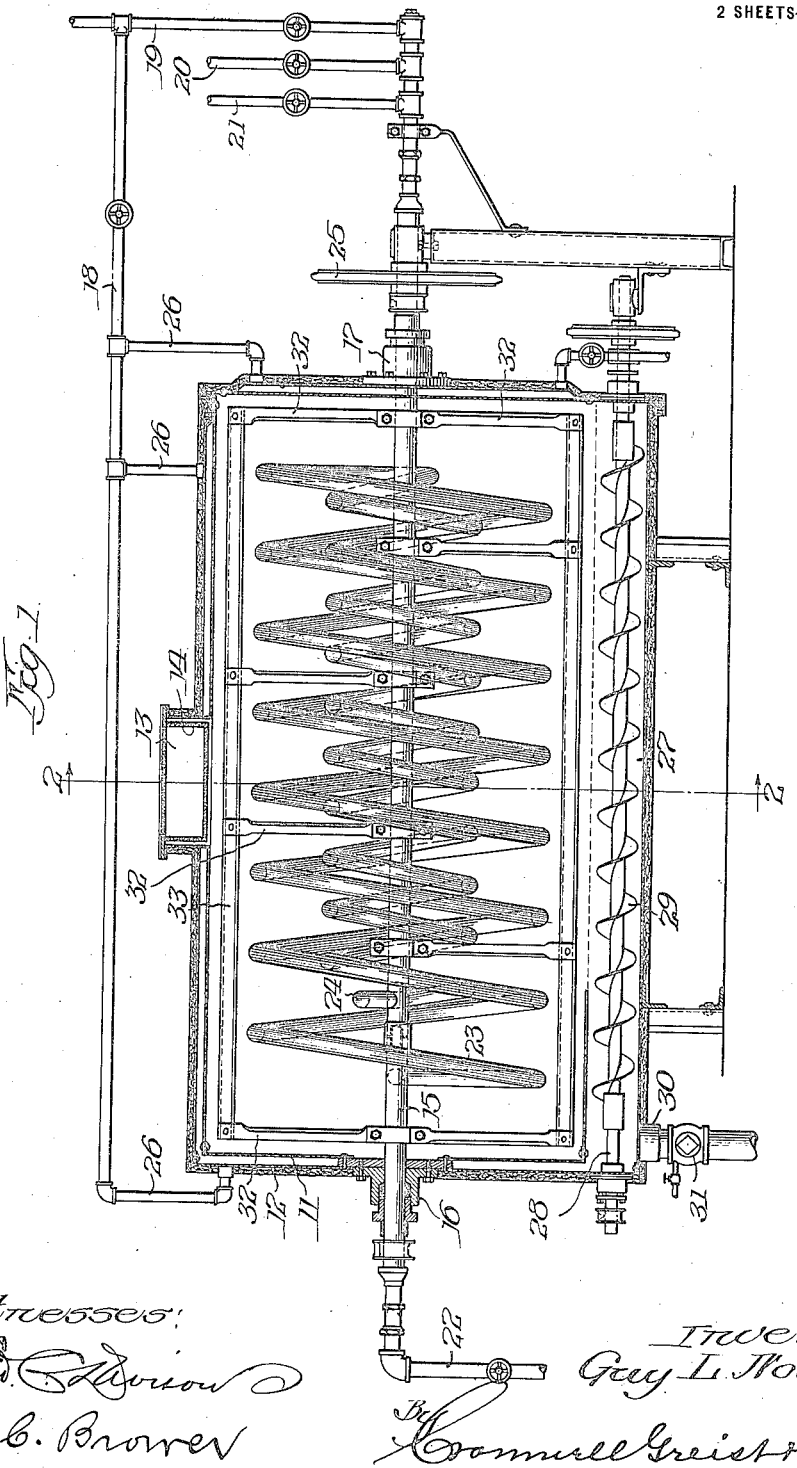

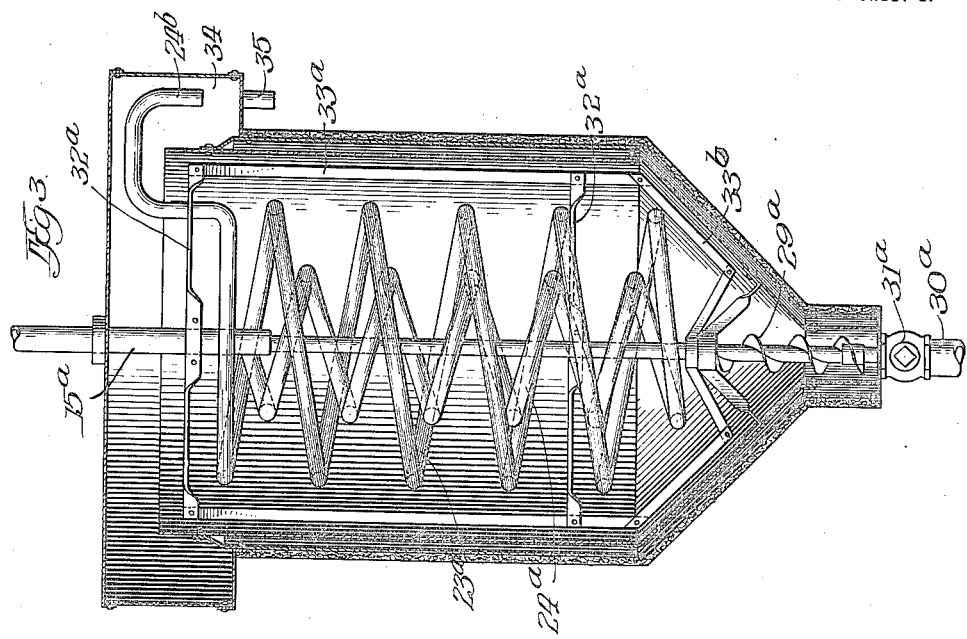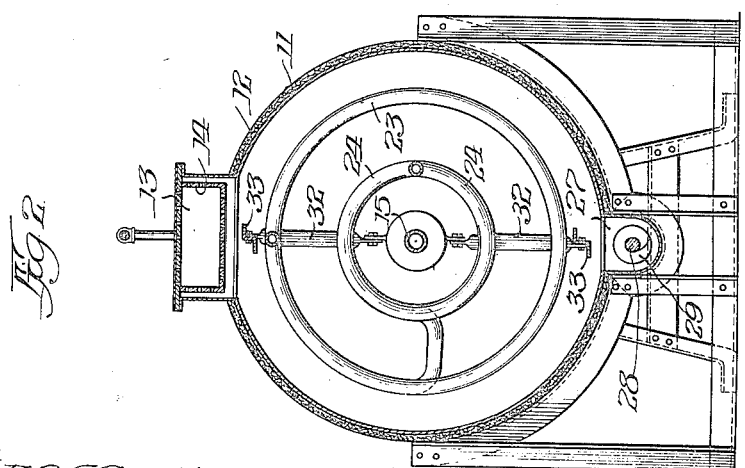

UNITED STATES PATENT OFFICE.

GUY L. NOBLE, OF CHICAGO, ILLINOIS.

OLEO-STOCK CLARIFIER, SEEDER, AND BREAKER.

1,240,869.

Specification of Letters Patent. Patented Sept. 25, 1917.

Application filed November 15, 1916. Serial No. 131,398.

*To all whom it may concern:*

Be it known that I, GUY L. NOBLE, a citizen of the United States, residing at Chicago, in the county of Cook and State of Illinois, have invented certain new and useful Improvements in Oleo-Stock Clarifiers, Seeders, and Breakers, of which the following is a specification.

In the manufacture of oleo oil for use in the preparation of various edible products such as oleomargarin, it is of the greatest importance that all of the steps shall be carried out with the strictest regard for sanitary conditions and for questions of economy in time and labor, space and material.

It is usual in this art for the beef fat or suet to be rendered at a temperature of approximately 150 to 160 degrees, the resultant liquid product being drawn off into tanks. It is then allowed to stand for some time at a temperature of about 140 degrees in order that the water and oil may be permitted to separate, thus "clarifying" the product. The water having been drawn off, the liquid stearin and oleo are allowed to stand in a room heated to approximately 90 degrees for three or four days during which it cools and becomes semi-solid and undergoes an "aging" or "seeding" process. At the end of the aging period the material has locally separated into stearin and oleo, globules of the latter being scattered throughout the mass. In order that it may now be brought into proper shape for the filter presses, it is important that the stearin and oleo be "broken", that is to say intimately mixed without rupturing the stearin crystals so that the mass may be presented to the cloths of the filter press in a homogeneous condition.

Heretofore it has been customary, after rendering, in order to keep the material at the proper temperature during clarifying, to allow the tank containing the same to stand for a considerable length of time, the contents of the tank being maintained by means of a hot water jacket at about 140 degrees; and after clarifying to transfer the contents of the tank to a tank truck in a room maintained at a temperature of about 90 degrees for "aging" or "seeding". This involves the regulation of the temperature of the rooms and a manual shifting of the tanks from place to place and a transfer of the material from one container to another. Much unnecessary time is thus consumed as a large body of material cools slowly and several days are necessary to bring the interior of the mass to the room temperature and to effect the necessary aging, there is also a loss of material in the transfer and cleansing of the tanks, besides being open to the objection that the seeding is non-uniform by reason of the exterior portion of the tank contents having cooled while the interior is still hot.

Moreover, by reason of the difficulty of devising a mechanical appliance for thoroughly mixing the mass within these large rectangular tanks, as previously employed, it has been customary for the men to plunge their arms into the tanks and by means of their hands and fingers stir the same thoroughly in all parts of the tank after aging for the purpose of breaking the same up preparatory to pressing. Obviously this is not sanitary especially in hot weather, and one object of the present invention has been the designing of a mechanical appliance which would effect this breaking of the material as thoroughly and efficiently as the human hand.

By the apparatus of the present invention, the material is at no time handled with the hand, and remains in the one tank from the time it is rendered until it goes to the filter press, the several steps of clarifying, aging or seeding and breaking being performed in one and the same tank, at ordinary temperatures without necessitating the special heating of a room for the purpose and in much less time than has heretofore been possible by reason of the heating and cooling of the same quickly and more uniformly by temperature modifying means supplied to the interior of the mass, while the same is protected from external temperature conditions by insulation.

In order that the invention may be more readily understood, a preferred embodiment of the same is set forth in the accompanying drawings in connection with a modification thereof, such illustration being used as a basis for the detailed description immediately following. Obviously, however, the invention may be embodied in other and varied constructional forms, wherefore the description and drawing are to be taken in an illustrative and not in an unnecessarily limiting sense.

In the drawing:

Figure 1 is a longitudinal vertical section through one embodiment of the invention;

Fig. 2 is a transverse vertical section on the line 2—2 of Fig. 1; and

Fig. 3 is a vertical longitudinal section through another embodiment of the invention.

Having reference first to Figs. 1 and 2 of the drawing, a suitably supported cylindrical tank is shown having double walls 11 and 12, the same being horizontally disposed and provided above with an inlet at 13 equipped with a strainer 14 through which the rendered material is introduced to the interior of the tank. A hollow shaft 15 extends axially of the tank through stuffing boxes 16 and 17, said shaft being supplied alternatively with hot water from the header 18 through the pipe 19, or with steam through the pipe 20 or cold water through the pipe 21, the said hollow shaft having an outlet at 22, each of the pipes being suitably valved in order to control the flow of the fluid therethrough.

Tapped off from the hollow shaft 15 on the interior of the tank is a pipe coil composed of inner and outer convolutions 23 and 24 surrounding the pipe and revolving therewith as the said shaft is driven from the drive pulley 25. The space between the walls 11 and 12 of the tank is supplied with hot water through the pipe 26 from the feed header 18. The regular curvature of the tank wall in the lower portion is interrupted to form a trough 27 within which is mounted a rotary shaft 28 having thereon helical blades 29 constituting of the same a screw conveyer. At one end the trough 27 is tapped by a discharge pipe 30 provided with a suitable valve 31. The hollow shaft 15 is likewise provided with radial arms 32 connected at their outer ends by means of blades or scrapers 33 arranged at an appropriate distance from the shaft 15 so as to operate closely adjacent the wall of the tank, insulated as shown.

In operation, the stock after rendering is run into the tank at 13 and hot water at a temperature of 140 degrees is allowed to circulate through the coil 23, 24, being introduced through the pipe 20, whereby to maintain a proper temperature in the mass during clarifying. The shaft is not rotated, so that the coil is stationary and the stock remains quiescent within the tank. After clarification, the valve 31 is opened and the underlying water is allowed to drain off. When oil appears at the outlet, the valve is closed. Warm water at a temperature of about 90 degrees is then introduced from the pipe 21 to the coil 23, 24, and the material is permitted to stand for about 24 hours or less, during which time the aging or seeding takes place. At the completion of this step of the process, the shaft 15 is rotated so as to thoroughly break up the mixture of stearin and oleo by means of the movement of the coils 23, 24, and the beaters 33 within the mass. When the breaking has been accomplished the valve 31 is again opened and the screw conveyer in the trough 27 is rotated so as to feed the broken stock out through the pipe 30, whence it is conveyed to the filter press.

Having reference to Fig. 3, substantially the same operations previously described are carried out in a cylindrical tank having a vertical axis and with the lower portion thereof of conical or hopper construction. Here the vertical shaft 15$^a$, hollow as in the former case, is arranged to be supplied alternatively with steam, hot water, or warm water. As in the former case the shaft may be hollow throughout and the pipe coils 23$^a$, 24$^a$ may be tapped to said shaft and revolved therewith, or the lower portion of the shaft 15$^a$ may be solid and the pipe coils 23$^a$, 24$^a$ may be stationary within the cylinder and supplied with fluid by being tapped to the upper hollow portion of the shaft, the water discharging at 24$^b$ into a receptacle 34 and from thence withdrawn at 35. The lower end of the shaft 15$^a$ is provided within the lower reduced portion of the tank with a helical screw conveyer 29$^a$ leading to an outlet 30$^a$ controlled by valve 31$^a$. As before explained, the shaft 15$^a$ has radial arms 32$^a$ connected at their outer ends by means of scrapers 33$^a$ operating closely adjacent the walls of the tank and arranged at an inclination 33$^b$ in the lower portion to correspond to the hopper shaped base.

In this form of construction the operation is precisely the same as that described with reference to Figs. 1 and 2 except that the screw conveyer 29$^a$ is constantly in motion and thus assists in the breaking of the stock in addition to its function of discharging of the stock to the outlet pipe 30$^a$ when the valve 31$^a$ is opened.

The present invention has many other advantages inherent therein such as the saving of room space, the saving of steam for heating and maintaining rooms at the proper temperature required where clarifying, aging and breaking is done at room temperature, and the saving of stock otherwise wasted in the cleansing of tanks after transfer of the stock from one to another. In one plant alone the installation of the present invention has resulted in a saving of many thousand dollars per year in steam and waste, the jacketed tank permitting specially heated rooms to be dispensed with and enabling the walls to be heated after discharging to melt the adhering stock and insure the complete emptying of the tank before cleansing.

I claim:

1. A combined clarifier, seeder and braker for oleo stock comprising a tank, a pipe-coil coaxially arranged within the tank, independent sources of supply of hot and cold fluid to the coil, scrapers arranged adjacent the tank walls, means to rotate the pipe and scrapers, and an upper inlet and a lower outlet for the stock.

2. A combined clarifier, seeder and breaker for oleo stock comprising a tank, a hollow shaft extending therethrough, a pipe arranged within the tank about the hollow shaft and in intercommunication therewith, independent sources of supply of hot and cold water to the pipe, means to rotate the shaft and pipe and an upper inlet and a lower outlet for the stock.

3. A combined clarifier, seeder and breaker for oleo stock comprising a cylindrical tank, a hollow shaft extending therethrough, a pipe coil coaxially arranged within the tank about the hollow shaft and in intercommunication with the latter, independent sources of supply of hot and cold water to the shaft and coil, an upper inlet and a lower outlet for the stock, the tank being constricted in its lower part, a screw conveyer in the constricted part, and means to rotate the screw conveyer.

4. A combined clarifier, seeder and breaker for oleo stock comprising a cylindrical tank, a shaft extending therethrough, a pipe coil coaxially arranged within the tank about the shaft, independent sources of supply of hot and cold water to the coil, means to rotate the shaft and pipe, an upper inlet and a lower outlet for the stock, a trough in the lower part of the tank leading to the outlet, and a screw conveyer in the trough, and means to rotate the screw conveyer.

5. A combined clarifier, seeder and breaker for oleo stock comprising a cylindrical tank, a shaft extending therethrough, a pipe coil coaxially arranged within the tank and connected to the shaft, independent sources of supply of hot and cold water to the coil, scrapers arranged adjacent the tank walls, means to rotate the shaft and pipe and scrapers, an upper inlet and a lower outlet for the stock, a trough in the lower part of the tank leading to the outlet, and a screw conveyer in the trough, and means to rotate the screw conveyer.

GUY L. NOBLE.

Witnesses:
ABRAM B. STEVENSON,
THOMAS J. KEOGH.